US009558013B2

(12) United States Patent
Ryman et al.

(10) Patent No.: US 9,558,013 B2
(45) Date of Patent: Jan. 31, 2017

(54) RESPONSIVE SCROLLER CONTROLS IN SERVER-HOSTED APPLICATIONS

(75) Inventors: Paul Adam Ryman, Sydney (AU); Donovan Ross Hackett, Marsfield (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/445,504

(22) Filed: Apr. 12, 2012

(65) Prior Publication Data

US 2012/0266068 A1    Oct. 18, 2012

Related U.S. Application Data

(60) Provisional application No. 61/474,697, filed on Apr. 12, 2011.

(51) Int. Cl.

| G06F 9/00 | (2006.01) |
|---|---|
| G06F 9/44 | (2006.01) |
| G06F 3/0485 | (2013.01) |
| G06F 3/0488 | (2013.01) |
| G06F 9/54 | (2006.01) |
| G06F 3/0481 | (2013.01) |
| G11B 27/34 | (2006.01) |
| G06F 1/16 | (2006.01) |
| H04N 5/445 | (2011.01) |

(52) U.S. Cl.
CPC .......... *G06F 9/4445* (2013.01); *G06F 3/0485* (2013.01); *G06F 3/04855* (2013.01); *G06F 3/04883* (2013.01); *G06F 9/542* (2013.01); *G06F 1/163* (2013.01); *G06F 3/0481* (2013.01); *G06F 2209/544* (2013.01); *G06F 2209/545* (2013.01); *G11B 27/34* (2013.01); *H04N 5/44543* (2013.01)

(58) Field of Classification Search
USPC ........ 715/719, 740, 744, 781, 784; 709/203, 709/219
See application file for complete search history.

(56) References Cited

U.S. PATENT DOCUMENTS

| 5,467,441 | A | * | 11/1995 | Stone et al. .................. 345/619 |
|---|---|---|---|---|
| 6,243,761 | B1 | * | 6/2001 | Mogul et al. ................. 709/246 |
| 8,271,898 | B1 | * | 9/2012 | Mattos et al. ................. 715/784 |
| 2006/0210196 | A1 | * | 9/2006 | Wensley ........... G06F 17/30902 382/305 |
| 2007/0121511 | A1 | * | 5/2007 | Morandin ..................... 370/235 |
| 2009/0106687 | A1 | * | 4/2009 | De Souza Sana et al. ... 715/784 |

(Continued)

OTHER PUBLICATIONS

Michael Swaine, Windows of opportunity, Jul. 1990, ZDNet, p. 221.*

(Continued)

*Primary Examiner* — Linh K Pham
*Assistant Examiner* — Tam Tran
(74) *Attorney, Agent, or Firm* — Banner & Witcoff, Ltd.

(57) ABSTRACT

Environments are disclosed in which a server executes an application on behalf of a client device and, in particular, to providing responsive scrolling in server-hosted applications. In one example, a remote computing device may be a mobile (or stationary) computing device with (or without) a touch screen input surface. Some or all of the client-server communication between a client-side scrollable UI control module of the remote computing device and a server-side scrollable UI control module of the server device may occur in an asynchronous manner.

16 Claims, 12 Drawing Sheets

Application (as user sees it)

Scroller layered over LVB

(56) References Cited

U.S. PATENT DOCUMENTS

2010/0269152 A1*  10/2010  Pahlavan et al. ................. 726/3
2013/0091543 A1    4/2013  Wade et al.

OTHER PUBLICATIONS

Darryl Lewis, Data on the run, Jun. 1991, ZDNet, p. 110.*
Comparison of remote desktop software, http://en.wikipedia.org/wiki/Comparison_of_remote_desktop_software, retrieved Apr. 11, 2012, 7 pages.
Citrix XenApp, http://en.wikipedia.org/wiki/Citrix_XenApp, retrieved Apr. 11, 2012, 3 pages.
Independent Computing Architecture, http://en.wikipedia.org/wiki/Independent_Computing_Architecture, retrieved Apr. 11, 2012, 1 page.
Performance Differences between Remote Desktop Protocol (RDP) and Independent Computing Architecture (ICA), J. D. Edwards Research Series, J.D. Edwards World Source Company 1998, dated May 24, 2001, 15 pages.

* cited by examiner

Application (User starting scroll)

Scroller layered over LVB

Uniform Graphical Panels  Dynamic Tile Content Dimensions

RESPONSIVE SCROLLER CONTROLS IN SERVER-HOSTED APPLICATIONS

CROSS-REFERENCE TO RELATED APPLICATIONS

This application claims priority from U.S. Provisional Application Ser. No. 61/474,697, filed Apr. 12, 2011, which is herein incorporated by reference in its entirety.

TECHNICAL FIELD

This disclosure generally relates to environments in which a server executes an application on behalf of a client device and, in particular, to providing responsive scrolling in server-hosted applications.

BACKGROUND

With the increase of mobility in computing devices, there has also been an increase in the need to access and execute applications from mobile devices. Many mobile devices have limited computing and storage capabilities. Mobile devices overcome these limitations by connecting remotely to a server to execute an application on its behalf.

One of the core problems with server-hosted applications accessed by a mobile device arises from network latency and bandwidth limitations. For server-hosted applications, there will usually be a lag between user input and graphical feedback, mostly attributable to network latency when connected over a network. On touch-based mobile devices without a mouse or keyboard alternatives usually do not exist or are cumbersome, and user expectations are generally higher. This problem is troublesome with touch-based mobile devices especially when coupled with the potential for adverse network conditions over wireless network connections, especially 3G services with unpredictable and anecdotally high latency (100 ms to 300 ms is not uncommon). High latency networks also include any network where conditions impose a perceptible reduction in user responsiveness when compared to using a locally installed application.

SUMMARY OF THE DISCLOSURE

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

A computer-assisted method is disclosed for use in hosted application remoting environments. In one example, after creating a session of a hosted application, a server computing device may determine if the graphical content representing a snapshot display of the executing, hosted application contains particular scrollable user interface (UI) controls. In addition, the server device may retrieve metadata about the identified scrollable UI control. This information, as well as prefetched tile content may be transmitted to a remote computing device configured to receive scrolling input actions, such as through a touch screen input surface. In some embodiments, the tile content may have varying dimensions based on various factors.

Furthermore, the remote computing device may detect scrolling input actions and adjust the displayed viewport with respect to the scrollable content. Information about the scrolling input action may be transmitted to the server device for analysis and additional prefetching. While the viewport is non-stationary, it may be set to opaque and filled with tile contents from cache memory on the local device. Once the viewport is stationary, the viewport may be set to transparent and the contents of the local video buffer (LVB) may be displayed.

In another embodiment in accordance with aspects of the disclosure, an apparatus is disclosed comprising a computer processor, memory, and/or an interface. In an alternate embodiment the computer memory may be wholly or partially located in a data storage system. One skilled in the art will appreciate that one or more of the aforementioned methods and features may be embodied as computer-executable instructions stored on a tangible computer-readable medium and executed by a processor.

The details of various embodiments of the methods and systems described herein are set forth in the accompanying drawings and the description below.

BRIEF DESCRIPTION OF THE DRAWINGS

The following figures illustrate various embodiments of the methods and systems described herein, in which like reference numerals refer to like elements. These illustrative embodiments are to be understood as illustrative of the disclosed methods and systems and not as limiting in any way.

In the drawings, like reference numbers generally indicate identical, functionally similar, and/or structurally similar elements.

DETAILED DESCRIPTION

Figure 1A:
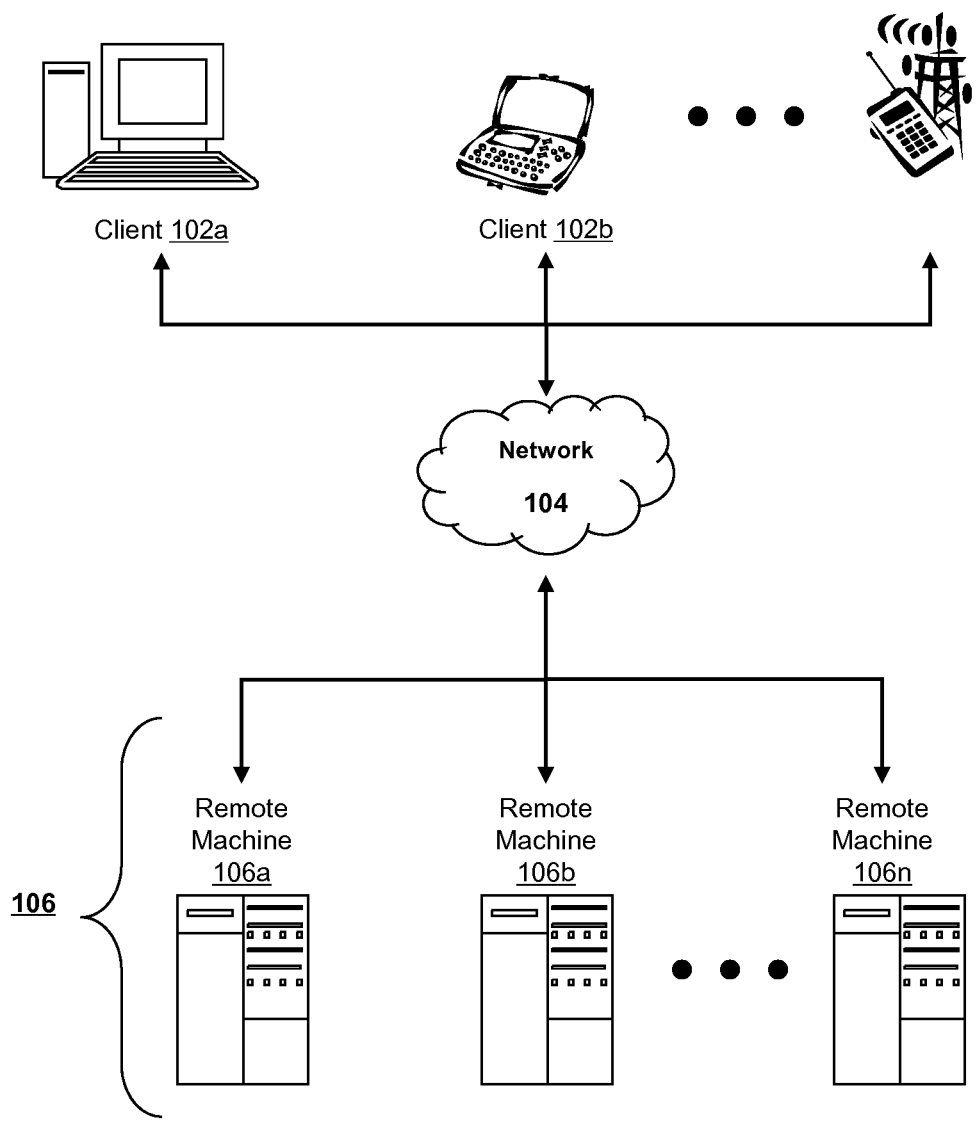
FIG. 1A illustrates embodiments of network environments that provide remote access to computing devices that can execute application programs.

For server hosted or hosted desktop applications to deliver a good user experience, touch and gestured based input should generally be highly responsive. Scrolling content by dragging a finger over the surface (also known as a "pan gesture") or swiping quickly to apply inertia (also known as a "flick gesture") are deemed as a particular common but resource intensive input operations. The scrollable content should track closely to the finger position, typically down to the pixel level accuracy, to ensure tracking of the scrollable content is responsive. Flicking content demands high frame rate animation as content scrolls and gradually slows to a stop (e.g., at a fixed rate of deceleration).

Described herein are methods and systems of remoting scrollable content to the client, with all touch and gesture (or other input methods, including mouse) operations processed on the client by local scroller module. The method and system described herein provide high fidelity, highly responsive scrolling in server-hosted applications. The performance and graphics quality of scrollable content in controls such as list boxes, data grids and map viewers, is comparable with the native device applications. The experience is essentially zero latency—each transitional movement of the viewport across the scrollable content occurs on the client, not the server. Only when a user-initiated scroll action is complete is the server-side control updated with the new viewport position. The impact on network and server resources is reduced significantly. The methods and systems described herein are capable of supporting pluralities of scroller controls, applications, sessions, and session hosts.

The application development requirements are low impact. Standard Windows development framework (such as Microsoft's Windows Presentation Foundation (WPF) as available in .NET 3.0 onwards) controls can be remoted with this method. The application developer does not have to develop specific code to handle the client-side remoting aspects.

The same application would behave equivalently whether remoted with or without this capability, remoted via any presentation protocol such as Remote Desktop Protocol (RDP), Independent Computing Architecture (ICA) or GoToMyPC, or run as a local application from the local console.

The methods and systems described herein may be used not only in conjunction with list box controls and simple textual content only, but also a range of controls presenting scrollable content are supported and graphical content can be arbitrarily complex while maintaining fidelity on the client. The experience may be a seamless, smooth switch between scrolling and being stationary and there may be no noticeable switch of modes. The experience is much the same on varying network conditions. A pre-fetching and caching mechanism may, in some embodiments, attempt to load regions of the scrollable surface area before being revealed. Pre-fetching also offers many opportunities to efficiently utilize network and server resources.

For at least one embodiment of the systems and methods described herein, there are some constraints related to the type of scrollable content, which are suitable for the system. These include the need for the content to change relatively infrequently. In at least one embodiment of the system, the system is not suitable for video or other animated content. In some embodiments, the scrolling must be pixel based and might not be based on item or other unit of movement. In some embodiments, the server-side control cannot perform special manipulation of the viewport content, such as moving visual elements to keep within view. Since some controls are not suitable in certain embodiments, the server-side SDK may provide an API for specifying which scrollers are enabled for highly responsive scrolling. Such controls may be remoted between the server 106 and the client 102 via traditional methods, such as by remote presentation layer protocols.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers.

The client machine(s) 102 can, in some embodiments, be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. In some embodiments, the virtual machine 102C can be managed by a hypervisor such as the Xen hypervisor, developed sold by Citrix Systems, Inc., Hyper-V, developed and sold by Microsoft Corp., ESX, developed and sold by EMC, or any other hypervisor. In various embodiments in accordance with this disclosure, a hypervisor may be an abstraction layer that supports running multiple instances of operating systems, each of which may be a virtual machine. One of those virtual machines may manage the physical device on which the hypervisor is executing. In some examples, each of these virtual machines may be optionally referred to as "domains," and the management domain may be referred to as "Dom 0" or "Domain 0".

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the XENAPP or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network;

an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; EV-DO; LTE; or any other protocol able to transmit data among mobile devices like 802.11, Bluetooth, and Near Field Communication.

Figure 1B:
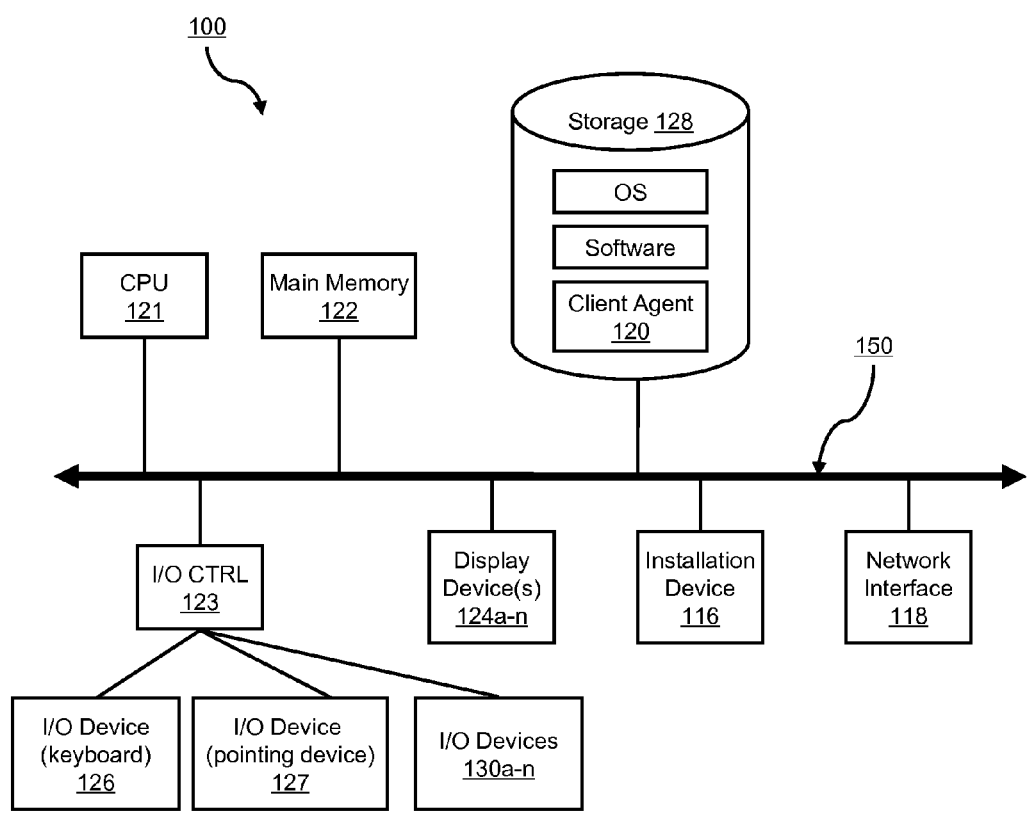
FIG. 1B and FIG. 1C are block diagrams that illustrate embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
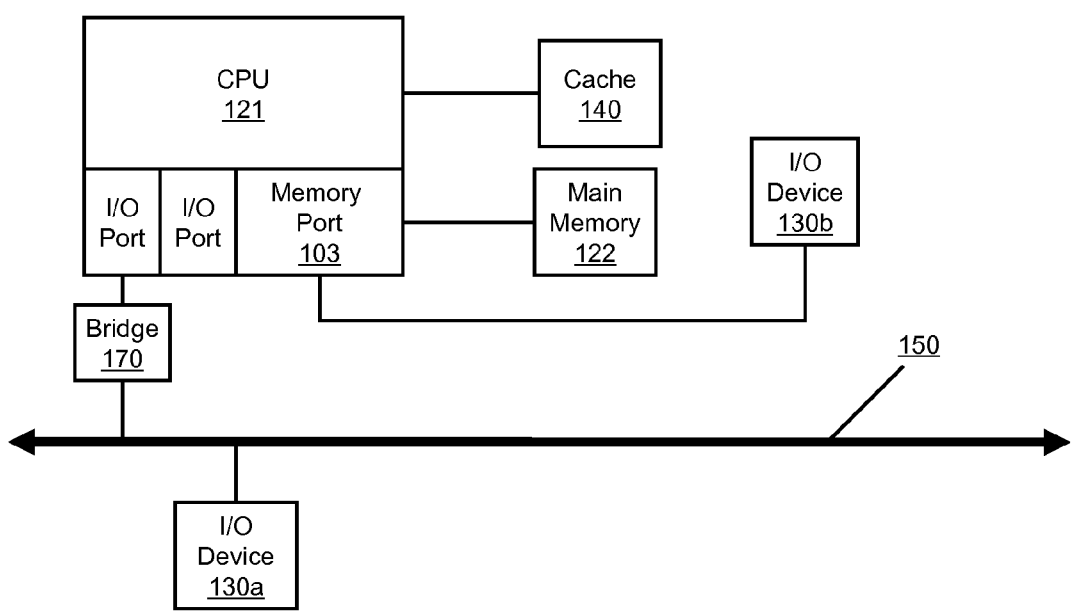

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics-processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; an AGP bus; or a NuBus.

Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); Memristor based memory; or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, a USB device, Secure Digital card, NetBoot or iPXE firmware, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

Figure 2:
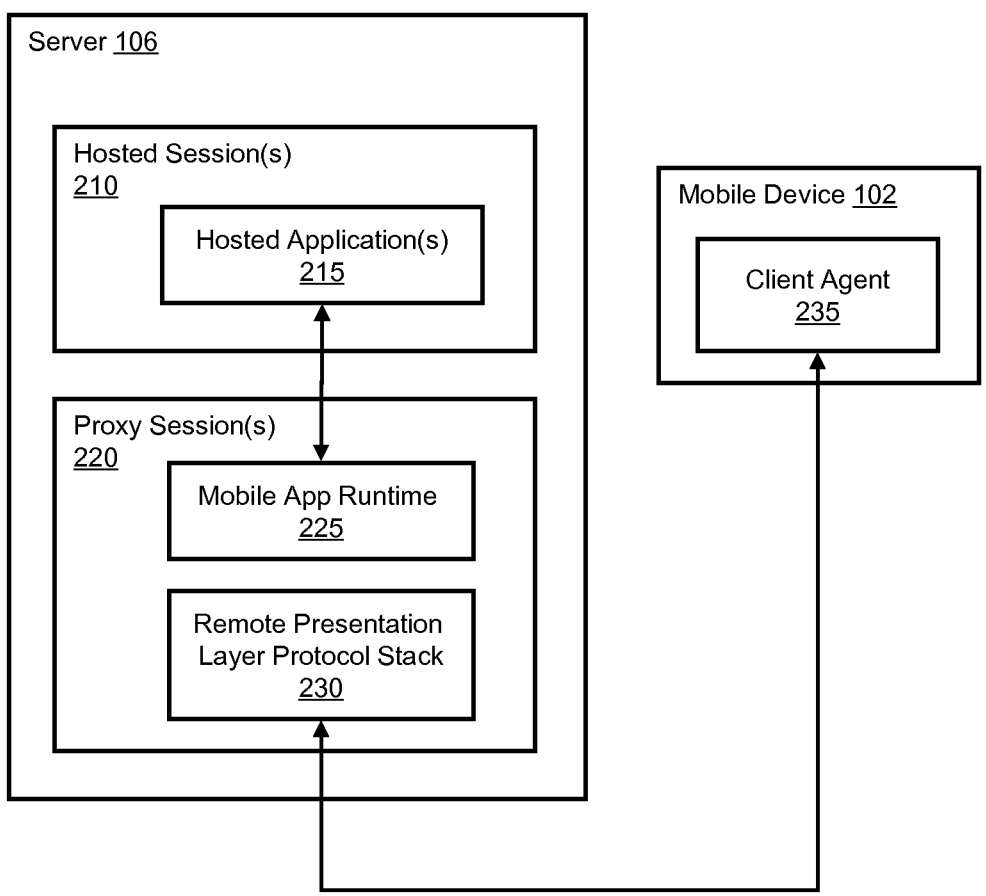
FIG. 2 is a block diagram illustrating one embodiment of a system for highly responsive scroller controls in a hosted desktop application.

Referring now to FIG. 2, a block diagram illustrates s one embodiment of a system for highly responsive scroller controls in a hosted desktop application. In brief overview, the system 200 includes a server 106 hosting one or more sessions 210. In the one or more hosted sessions 210 executes one or more hosted applications 215 (e.g., creating a session in computer memory 122 of the hosted application 215 in step 702 associated with the remote computing device 102). A proxy session 220 executing on the server 106 may include a mobile app runtime component 225 and a remote presentation layer protocol stack 230. The mobile app runtime component 225 communicates with the hosted application 215. The remote presentation layer protocol stack 230 communicates with a client agent 235 executing on a mobile computing device 102.

Referring now to FIG. 2, and in greater detail, a mobile computing device 102 executes a client agent 210. In one embodiment, the mobile computing device 102 is a client 102 as described above in connection with FIGS. 1A-1C.

The mobile computing device 102 comprises a client agent 235. The client agent 235 may include any type or form of hardware and/or combination of hardware and software. The client agent 235 may include any application, program, library, script, process, task thread or any type and form of executable instructions that executes on a client computing device. The client agent 235 may connect to one or more servers 106 in the system 200 over a presentation layer protocol, such as the ICA protocol by Citrix Systems, Inc., the remote desktop protocol (RDP) by Microsoft, X Window System, or other similar network protocol.

In some embodiments, the client agent 235 initiates a connection with a server 106 of the system. The server 106 may be any type of server or computing device described herein. In some embodiments, the server 106 may comprise one or more servers or devices as described herein.

In some embodiments, the client computing device 102 establishes a connection with the server 106. The server 106 establishes a user session 220 containing (e.g., associated with) a remote presentation layer protocol stack 230. Such a remote presentation layer protocol stack may be created (in step 706) by the server device 106 and correspond to a remote computing device 102 of the user. The client agent 205 executing on the client 105 communicates with the proxy session 220 executing on the server 106. The client agent 235 transmits and receives protocol data streams to and from the server 106. In some embodiments, a plurality of clients 102 executing client agents 235 may connect with a server 106. In other embodiments a client 102 executing a client agent 235 may connect with a plurality of servers 106. In other embodiments a plurality of clients 102 executing client agents 235 may connect with a plurality of servers 106.

In some embodiments, the hosted application 215 executing in a hosted session 210 of a server 106 is built using a specific desktop application framework. In some embodiments, the desktop application framework can be .NET/WPF, .NET/Windows Forms, Java or Adobe Air. In some embodiments, the hosted application 215 utilizes and is associated with a mobile application software development kit (SDK). In some embodiments, the desktop application framework and the mobile application SDK are linked into the hosted application executing in the hosted session 210 of the server 106. In some embodiments, the desktop application framework and the mobile application SDK execute within the same process space.

In some embodiments, the mobile application SDK contains the logic for enumerating and controlling scroller user interface (UI) controls contained within the hosted application 215. In some embodiments, the mobile application SDK acts as a bridge to the mobile app runtime 225 component executing in the proxy session 220. In some embodiments, all hosted sessions executing on the server 106 share the mobile app runtime component 225 executing in the proxy session 220. In some embodiments, the mobile app runtime component 225 transmits virtual channel data related to the scrolling capability to and from the remotely connected client agent 235 via a remote presentation layer protocol. For example, the mobile application runtime component 225 may comprise computer-executable instructions configured to discover, enumerate, and/or control a scrollable UI control contained in the hosted application. In some embodiments, the client agent 235 executing on the mobile client device 102 has been modified with the scrolling capabilities. For example, a remote computing device 102 may be a mobile (or stationary) computing device with one or more of at least the following components: a touch screen input surface configured to receive scrolling input actions, at least one memory comprising at least a cache memory 140 and a local video buffer (LVB), a display device configured to display data stored in the local video buffer, at least one processor, and at least one memory storing computer-executable instructions.

In some embodiments, the client agent 235 creates local scroller modules (e.g., client-side scrollable user interface control modules) responsive to receiving instructions from the proxy session 220. In some embodiments, the proxy session 220 transmits metadata including the position and size of scrollable controls within the hosted application 215 on the hosted session 210. Other controls and graphical content (e.g., a snapshot of the display of the hosted application) may be transmitted (e.g., in step 714) to the client agent 235 over a virtual channel protocol for remoting the display of the hosted application 215. In some embodiments, the controls and graphical content may be transmitted to the client agent 235 using ThinWire or other graphical high definition user experience (HDX) technologies developed by Citrix Systems, Inc. In another example, the graphical content may include data associated with command remoting of a display of the hosted application. Some examples of such data associated with command remoting include, but are not limited to, drawing commands (e.g., draw polygon, draw rectangle, render circle, fill background, etc.) and other commands with input parameters to remote the display of the hosted application 215. The command remoting may be used in lieu of or in combination with graphical bitmap images known in bitmap remoting approaches.

In some embodiments the mobile app SDK of the hosted application 215 is capable of discovering, enumerating, and controlling scrollable controls within the hosted application 215. For example, the mobile application runtime component 225, may (in step 704) determine or assist in determining if the graphical content of the hosted application 215 includes a scrollable UI control. On discovery of a new scrollable control or state change to a known control, metadata and state about the scroller UI control is extracted (e.g., retrieved in step 708) and sent to the mobile app runtime 225 for the session. This metadata may include each scroller's rectangle bounds in screen coordinates (i.e. position and size, excluding the control's border), the extent of the scrollable content, the viewport position onto this extent, whether the control is visible, and/or it relative z-order to other scroller controls in the same application and session. In some embodiments, the metadata may include the control's background color and/or scrollbar visibility. This is data required to create and control the state of an equivalent client side control in the client agent 235, excluding the actual scrollable content. In some embodiments, the client agent 235 connects or reconnects to the proxy session 220 executing on the server 106. When the client agent 235 connects or reconnects to the proxy session 220, the scrolling capability is negotiated with the server 106. If both sides support the capabilities described herein, the server 106 will transmit (e.g., see step 716) the metadata for all known scroller controls to the mobile client device 102 for their receipt (e.g. see step 804) and use. The mobile device 102 may render on its display a viewport (e.g., see step 810) of the scrollable UI control and/or a scroll bar (e.g., see step 812), based on the received metadata. In some embodiments, during the lifetime of the client connection, any new scroller controls created, scroller controls destroyed, or server-side changes to scroller states will be immediately communicated to the mobile computing device 102. In some embodiments, the client agent 235 will respond by creating or destroying local device scroller controls, or changing the state of the existing scroller controls. The position, size, and z-order controls that were created on the server 106 will be reflected onto the client computing device 102.

Figure 3A:
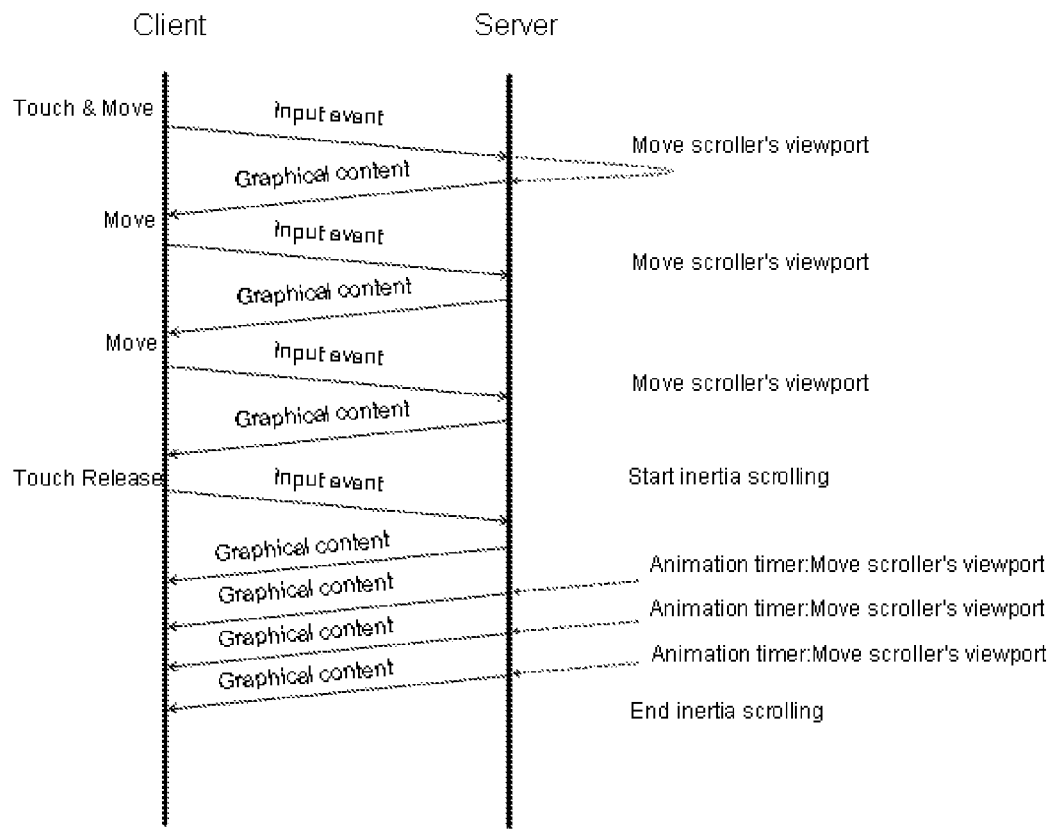
FIG. 3A is a diagram illustrating the message flow between a mobile client device and server for a gestured flick scrolling action in a traditional hosted desktop application.

Now referring to FIG. 3A, a diagram illustrates the traditional message flow between client 102 and server 106 for a gestured flick scrolling action. In some embodiments, the server-side controls have been developed or modified to mimic gesture-based scrolling found on many smart phones and tablet devices.

In FIG. 3A, the round-trip latency is noticeable on each finger movement across client device input surfaces, such as a touch screen. As the scroller's viewport moves, small movements lead to frequent and small response packets with thin or narrow bitmap images that compress poorly. A full round-trip is generated for each move operation and the graphical response can noticeably lag the input events.

In some embodiments, any horizontal movement in the viewport can lead to additional overhead. In some embodiment, a virtual channel protocol for remoting the display of the hosted application 215 is used to transmit the user initiated gesture input. In some embodiments, the mobile computing device 102 includes a cache. In some embodiments, the cache 140 stores all data used to render any graphics for the local scroller module. In some embodiments, the cache stores only data received from the server. In other embodiments, the cache stores data received from the server as well as generated by the mobile computing device. In some embodiments, the cache of the virtual channel protocol may not perform well with sideways image movements.

In some embodiments, upon the release of the finger, inertia is to the server-side scroller's viewport. An animation sequence begins on the server 106 based on a timer and each frame generates graphical content that must be sent to the client 102. In some embodiments, the fast scroll action by the user has the potential to generate a large number of frames, queuing and tossing events leading to the loss of frames and potential for bandwidth saturation. Even if the super cache of the virtual channel protocol is utilized for subsequent scroll activities, the underlying network latency still impacts responsiveness, as round-trips are required for each finger movement.

Figure 3B:
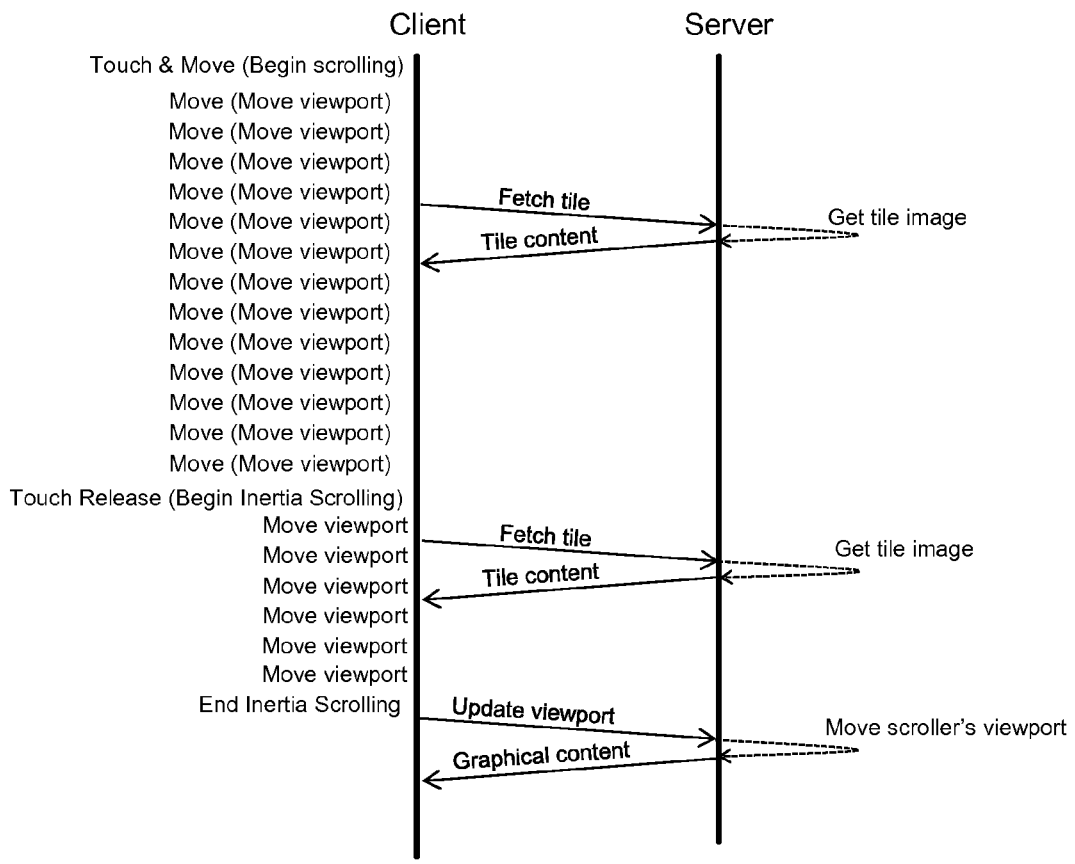
FIG. 3B is a diagram illustrating the message flow between a mobile client device and server for a gestured flick scrolling action in a system for highly responsive scroller controls in a hosted desktop application.

Now referring to FIG. 3B, a diagram illustrates the message flow between client 102 and server 106 for a gestured flick scrolling action in a system for highly responsive scroller controls in a hosted desktop application. As shown, the system for highly responsive scroller controls in a hosted desktop application reflects fewer interactions with the server 106 on which the hosted application 215 is executing.

In some embodiments, if the viewport of the local scroller module on the mobile computing device 102 is changed or the control repositioned or resized, then it is necessary to cancel the client-side scroll action, if active. The user will observe scrolling of the local scroller module suddenly halt. If the extent of the scroll area changes, this does not necessarily mean the scrolling needs to be cancelled. Depending on whether the client side viewport being scrolled is still within the extent and how the content is affected (e.g. adding a new item to the top of a list, such as when a new email is received, will cause all content within the extent to shift downwards—cancelling the client-side scroll action is thus required). A server-side SDK may provide means to change scroller extent sizes or notify of content changes that require a cancellation of client-side scroll actions.

When compared to FIG. 3A, FIG. 3B illustrates a greatly reduced frequency of data between the client 102 and the server 106. The figure also illustrates that the client-side scroller actions are processed asynchronously to tile fetch requests, thereby reducing the latency that may be experienced by the user.

Figure 4A:
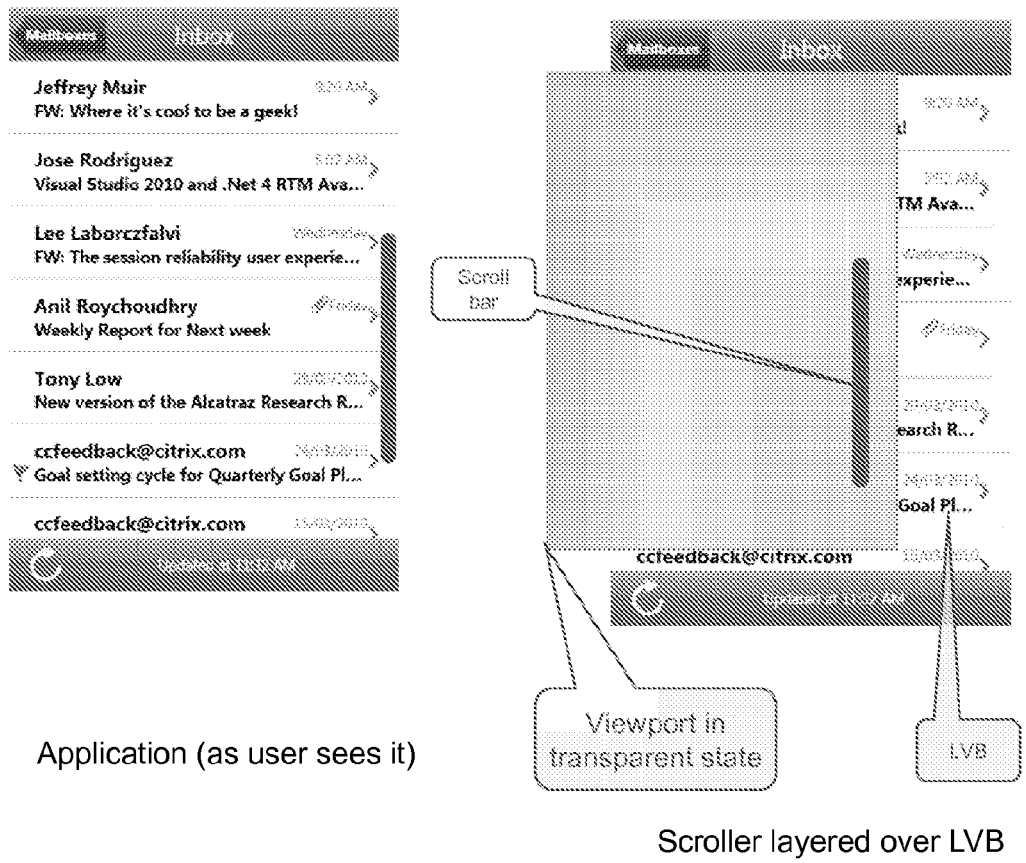
FIGS. 4A-4B illustrate screenshots of a mobile client computing device for highly responsive scroller controls of a hosted desktop application are illustrated.

Now referring to FIG. 4A, screenshots of mobile client computing device 102 for highly responsive scroller controls of a hosted desktop application are illustrated. One of the many differentiating attributes of the systems and methods described herein is the graphic content displayed for the scroller is standard content for a virtual channel protocol for remoting the display of the hosted application 215. While the scroller module on the client device is stationary, the local video buffer (LVB) content within the scroller's rectangular region is displayed. This is achieved by creating client-side scroller modules that are visible and capable of processing touch input events, but are purely transparent, except for the scroll bars. One analogy is that the scroller controls are small panes of glass that overlay the larger LVB surface underneath. While stationary, the visible image of the scroller controller, including border and content, but excluding the scroll bars, is all server-generated. Such layering techniques are illustrated in FIG. 4A.

One benefit of such a system is that the capabilities of the virtual channel protocol for remoting the display of the hosted application 215 are used for communicating graphical content while the scroller module of the mobile client device 102 are stationary. Thus, there are no image transcoding artifacts that may make the scroller's viewport image look different from the surrounding virtual channel protocol content.

The client agent 235 is capable of responding to touch, gesture or other user input actions (e.g., scrolling input actions) captured by the local scroller modules without interrupting the graphical display. Touch events on client on client scroll controls that do not start a scrolling action, such as a tap, or tap-and-hold, multi-touch pinch (e.g., pinch zoom), zoom, or other similar actions, will be passed through to the server 106 by a remote presentation protocol as mouse down, mouse up or equivalent raw touch or gesture events. For a scrollable list box control, such an action may cause a change of item selection. The client 102 does not perform any meaningful processing on these events. The handling of a click or tap event is purely up to the hosted application 215. For example, it could be a simple list box selection or as complex as setting a way-point on a scrollable map control.

Figure 4B:
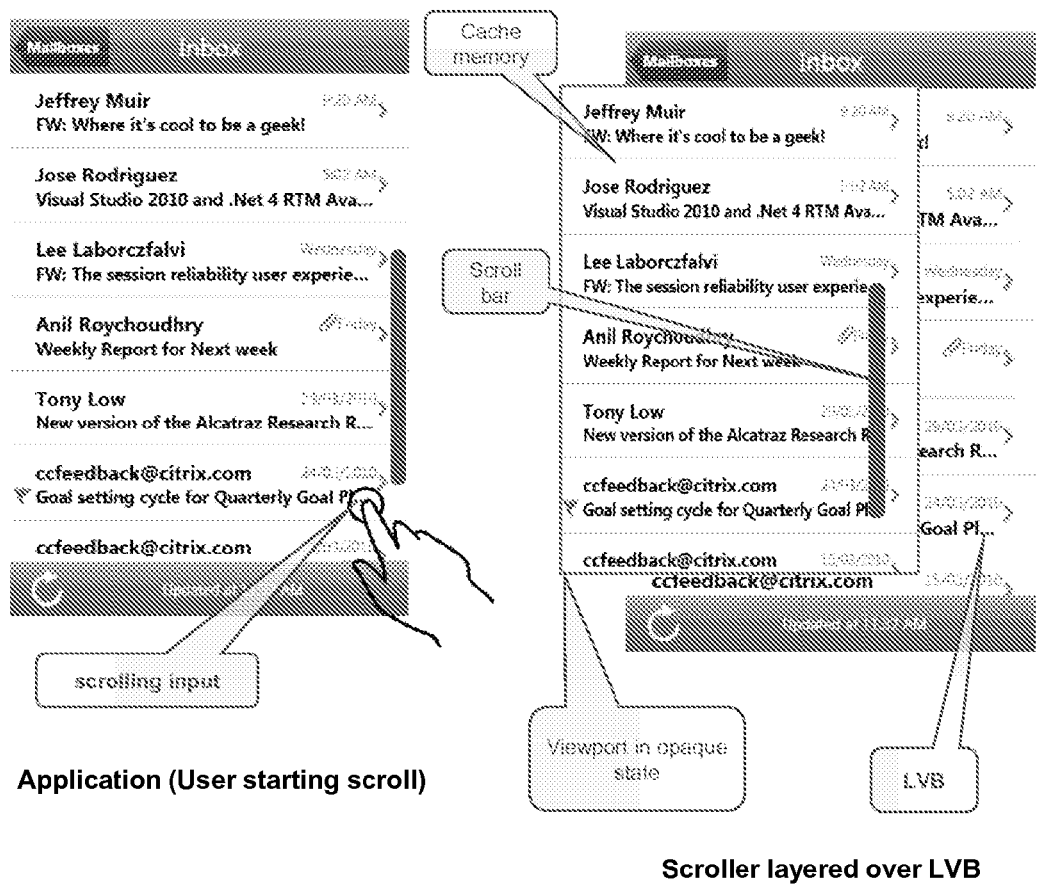

Now referring to FIG. 4B, screenshots of mobile client computing device 102 for highly responsive scroller controls of a hosted desktop application are illustrated. Upon a client scroller module executing on a mobile computing device 102 detecting the beginning of a scroller operation, the local scroller module switches into an active processing mode, as illustrated. The client agent 235 generates a copy of the region from the LVB with the dimensions of the scroller control and makes the generated copy the initial frame to display in the client scroller control's viewport. The local scroller is then switched from transparent to opaque, essentially obscuring the underlying LVB image. The transition is visually seamless as the image in the local scroller's viewport is initially precisely the same as the image underneath on the LVB. No communication with the server 106 is required to start scrolling, so the response is immediate.

As shown in FIG. 4B, the LVB never has the image of the scroll bar upon it and is only ever displayed by the native client side control. The SDK linked in within the hosted application 215 is aware that the client agent 102 has enabled the highly responsive scroller controls. In some embodiments, the SDK lined within the hosted application 215 will automatically hide the scrollbars. This action is useful for the LVB-to-scroller-module copy mechanism can take an unobscured snapshot of the LVB.

The client scroller control (i.e., client-side scrollable UI control module) may be in full control of scrolling until the user scroll action is complete. No changes will occur on the server-side scroller control (i.e., server-side scrollable UI control module) until the action is complete. Essentially, the server-side scrollable UI control module may remain stationary and, in some embodiments, unaware that the user is currently scrolling. For example, some or all of the client-server communication between a server-side scrollable UI control module of the server device 106 and a client-side scrollable UI control module of the remote computing device 102 may occur in an asynchronous manner. The server-side scrollable UI control module may receive information about scrolling actions (e.g., either as requests for particular pre-fetch tile content, or as information about scrolling actions that may be used to calculate tile content dimension and/or which tile contents to pre-fetch) from the client-side scrollable UI control module. The server-side control may adjust (in step 724) the position of the viewport with respect to the scrollable content accordingly.

As the client scroller's viewport position is moved horizontally or vertically across the extent of the content, rectangular regions will be revealed and will require graphical data from the server 106 to fill in the blanks. At no time will client 102 scrolling feel laggy or jerky waiting for network I/O operations to complete. Whatever graphical content is available for display will track responsively under the finger.

In some embodiments, the server 106 is capable of capturing the graphical content for these rectangular regions, or tiles, that are not necessarily visible within the viewport of the server-side scroller control. How this data is captured depends on the capabilities of the specific application framework.

In some embodiments, the server 106 when implemented using Microsoft's .NET Windows Presentation Foundation (WPF) application framework, obtains reference to a ScrollContentPresenter control part within all ScrollViewer controls. The control part is purely the content to be scrolled and excludes the border, scroll bars, and other adornments. The viewport position on the ScrollContentPresenter is temporarily changed to the desired tile position. The size of the ScrollContentPresenter control is temporarily changed to the desired tile size. Any visual element is rendered to a target bitmap to capture the image of the ScrollContentPresenter to generate the tile image required. The viewport position and control size are reverted back to their original values. The tile is encoded and sent to the client 102 in response to the original request. In some embodiments, the "temporary" change in viewport and control size has no impact on the rendering pipeline as the whole sequence occurs in one UI thread dispatched event handler. The original control properties are restored before the rendering thread does its processing. As there is no change, no new graphical content, and thus no virtual channel traffic, is generated.

Figure 5:
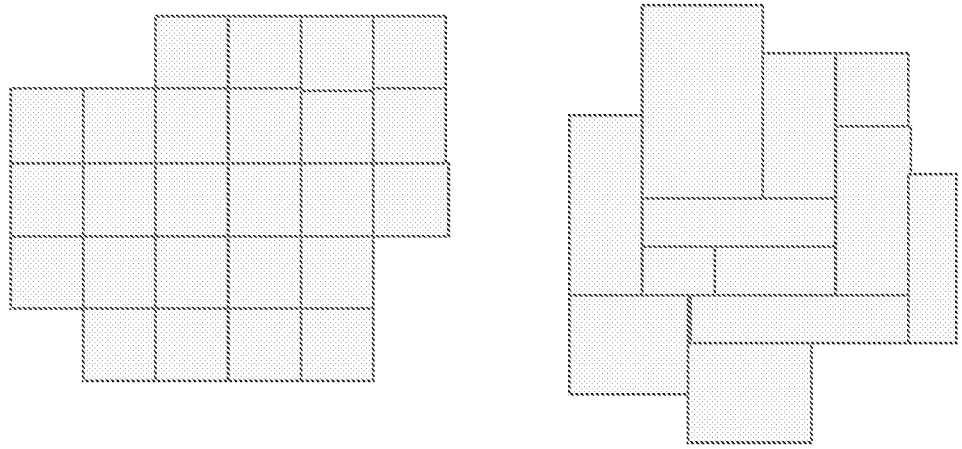
FIG. 5 is a diagram illustrating the difference between a well-known use of tiles in Google Maps and tiles for methods and systems for highly responsive scroller controls of a hosted desktop application.

Now referring to FIG. 5, a diagram illustrating the difference between a well-known use of tiles in Google Maps and tiles as described herein. Google Maps uses uniform 2D arrays of uniformly sized rectangular tiles. The tiles described herein are based on non-uniform layouts of non-uniformly sized rectangular tiles. Request for tiles are only initiated by the client agent 215 just-in-time when regions of viewport require content. This essentially means blank areas are visible for short periods of time waiting for tiles to download. If latency is high, the effect may be disconcerting to the user.

Tiles can be locally cached on the client 102 so that moving the viewport over the regions already viewed are serviced from the cache. It is however, typical that the viewport will be moved into new areas of scroller's extent.

In some embodiments, the client 102 (e.g., client-side scroller UI control module) may request and cache tiles. In some embodiments, tiles are pre-fetched and cached for an area larger than what is immediately required, and/or regions outside the viewport that are "likely" to become visible while scrolling or even before the user starts scrolling. For example, if a vertical scrolling list box has its viewport positioned at the top of its extent, the client 102 may choose to pre-fetch a tile of a certain size below the current viewport in the likely event the user will scroll down. If the user does start to scroll down, this pre-fetched tile can be used to display content and there is no lag waiting for new content to become available.

During scrolling, areas of the scroller's extent that are likely to become visible are largely based on the direction and velocity the user is scrolling. For example, a processor 121 of a client device 102 (or alternatively, of a server device 106) may identify (e.g., in step 710) scrollable content outside of a viewport of the scrollable UI control, based on information about direction of scrolling and/or velocity of scrolling received (e.g., in step 722) about a remote computing device 102. In one example, step 710 may further include identifying tile content of the scrollable content and/or tile dimensions based on measured latency of the network over which the server computing device 106 and the remote computing device 102 communicate. Tiles can be pre-fetched (e.g., see step 712) and transmitted (e.g., see step 718) for caching at the remote computing device 102 before the scroller's viewport reaches the pre-fetched tile contents.

In step 712 when the tile content is pre-fetched, there are a number of supplementary methods and parameters, such as those predetermined factors listed below, that can be used to determine the desired size (e.g., dimension, such as length and width of the tile content) of pre-fetched tiles. Estimation, statistical analysis or other heuristics could be used to determine what portions of downloaded tiles are actually becoming visible to the user. If only 20% of the area of cached tiles is ever becoming visible (on average), there is 80% wastage; tiles are too large. At the opposite end of spectrum, if running closer to 100% utilization then the tiles are too small, requiring more frequent server requests and with a higher likelihood the user will experience blank areas. Utilization levels could be measured and used as feedback into a closed-loop control system to improved future tile size requests.

If the user has performed a flick applying inertia to the scroller's viewport, the precise final landing position of the viewport can be calculated (if the scroll action is permitted to complete by the user). This is because as the user releases the finger from device surface, the direction of scrolling is fixed, the velocity is known and the rate of deceleration is a well-known constant, in one example. For example, the rate of deceleration may be used (in step 828) by a client-side scrollable UI control module to calculate a final landing position of a viewport as a result of a scrolling input action. In some embodiments, the rate of deceleration set for an input device (e.g., a touch screen input surface) of different mobile devices 102 may vary. A calculation determines the final position and tile dimension can be accurately determined.

Other potentially important parameters include:
Actual/measured network latency
Bandwidth
Network queue lengths
Download size of encoded data (e.g. tiles of photographic images are larger and may require smaller tile sizes)
Bandwidth costs (particular with limited 3G download limits)
Device memory limit constraints
Image encoding method used (many small, thin or narrow image don't compress well)
Proximity to an edge of the scroller's extent (it might be preferred to "snap" to the edge of the extent to prevent requiring additional thin/narrow tiles to fill the remaining space)

Another common approach is to progressively enhance image quality or use image formats capable of decoding progressively. Download highly compressed low fidelity tile images for fast download and immediate usage, while the larger lossless image is transferred after. Progressive decoding of an image provides incremental rendering of the image before the complete image has downloaded.

Another encoding and caching approach is to integrate with the super-cache of a virtual channel protocol for remoting the display of the hosted application 215. In some embodiments, this may provide a bitmap cache management facility that reduces network traffic and increased cache hit rates. The mobile device 102 may have memory constraints, tile image data may age and become stale, tiles that are "far away" from the current viewport may be deemed as unlikely to be used again. The client 102 may choose to reuse or discard cached tiles between separate scroll actions.

The completion of a user scroll action is the transition from scrolling to stationary, or the user initiating a new scroll action (maybe by swiping again before previous flick scroll has come to rest). During the scroll action, no viewport updates were sent to the server 106. The server-side control has been completely stationary through the whole client-side scrolling process. The advantage has been the relatively low impact on processing, network and other server resources (apart from the overhead of processing tile requests).

Now that the scroll action is complete, the client 102 needs to inform the server 106 of the control's new viewport position, and revert back to its transparent state continuing to show the LVB underneath. However, since there is going to be some latency in obtaining the server-side graphical updates for the new viewport, the client 102 copies its local scroller module's content back onto the LVB as a temporary measure until the server-side updates are received. The server will adjust the server-side scroller control's viewport, which will generate some new graphical content sent back to the client 102 by a virtual channel protocol. This will update the client-side LVB and overwrite any graphical artifacts, blank areas, or stale content left behind by the client-side scroller. The true server-side state is displayed.

Figure 6:
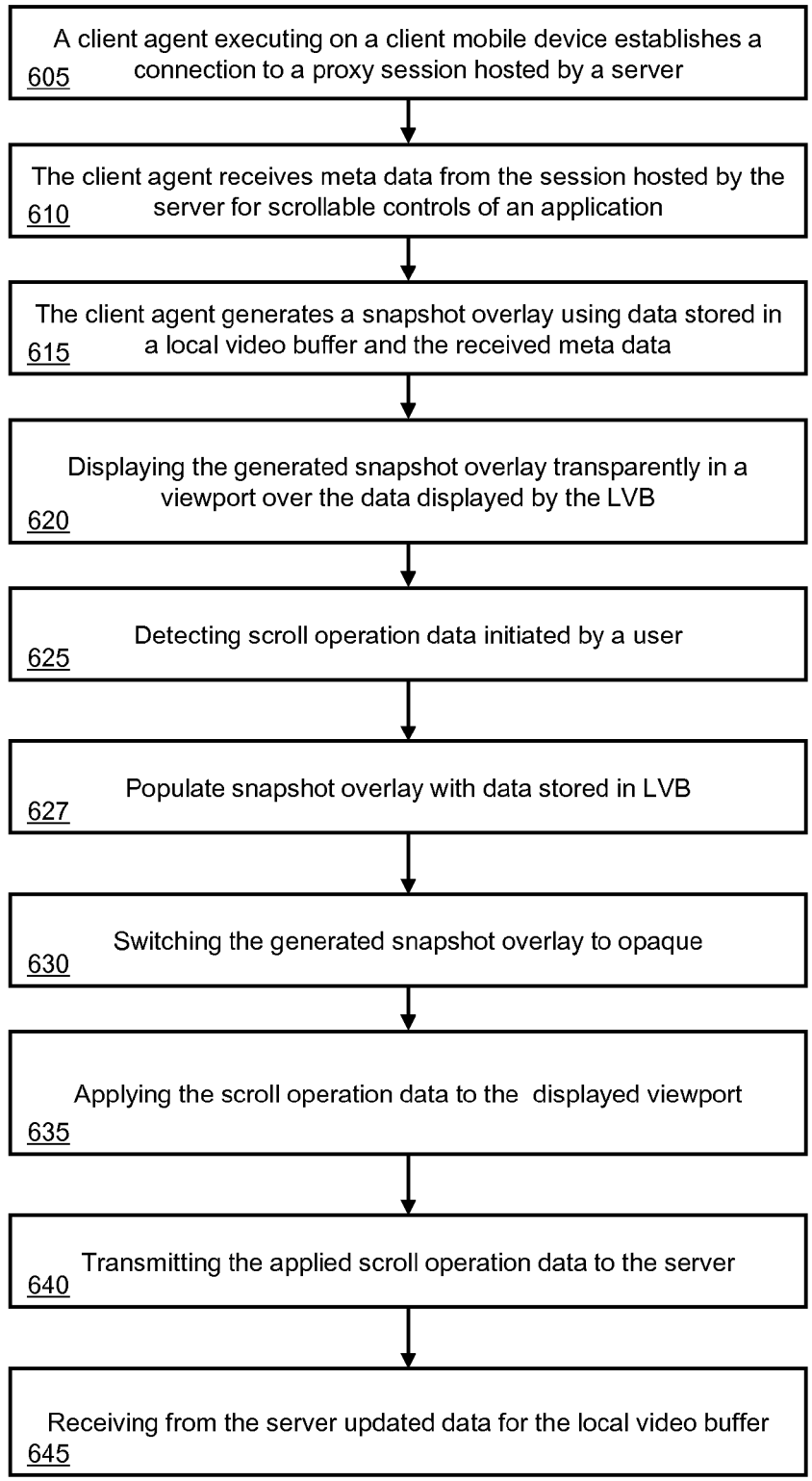
FIG. 6 is a flow diagram illustrating one embodiment of a method for highly responsive scroller controls in a hosted desktop environment.
Figure 7:
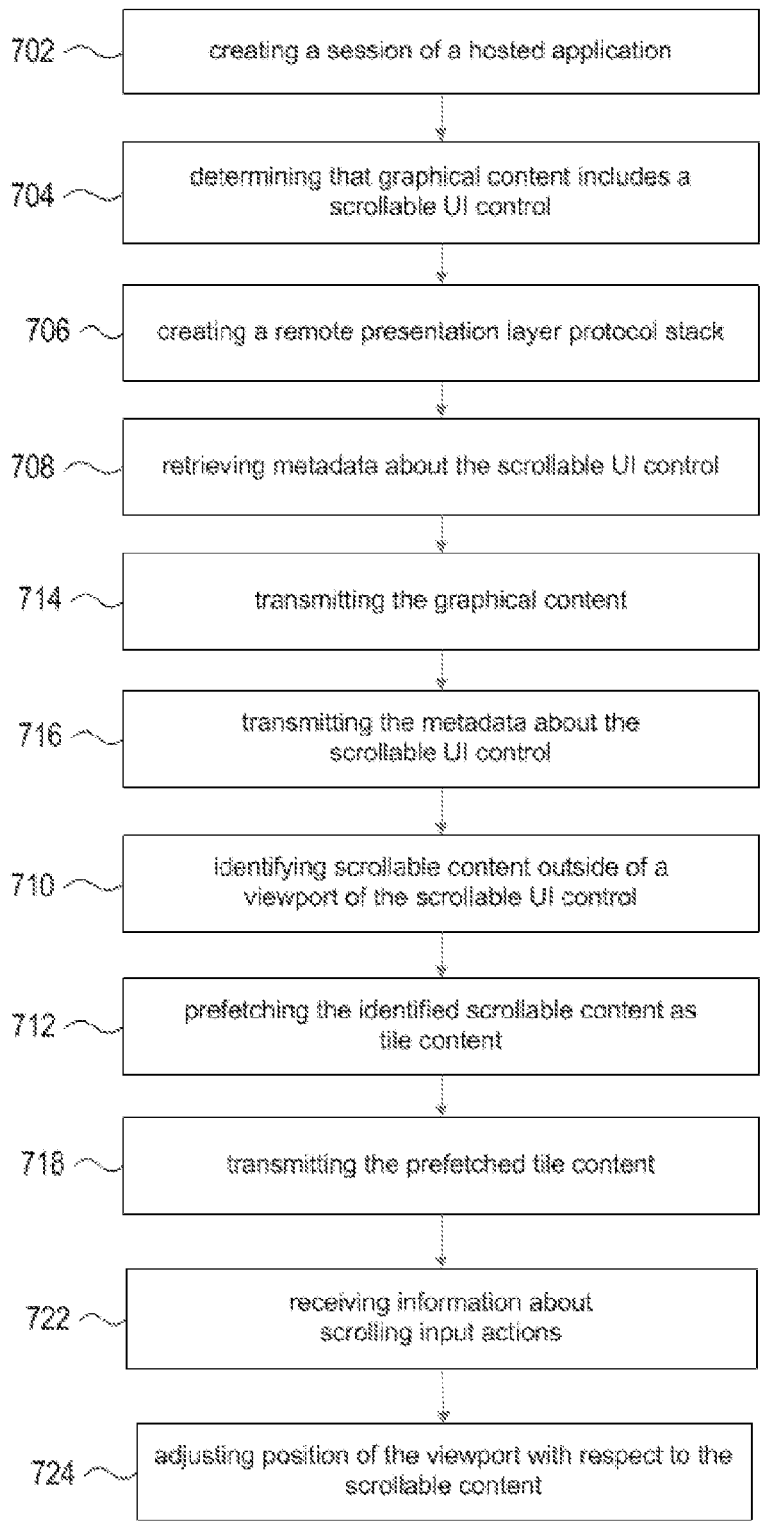
FIG. 7 and FIG. 8 are flowcharts illustrating a computer-assisted method in accordance with various aspects of the disclosure.
Figure 8:
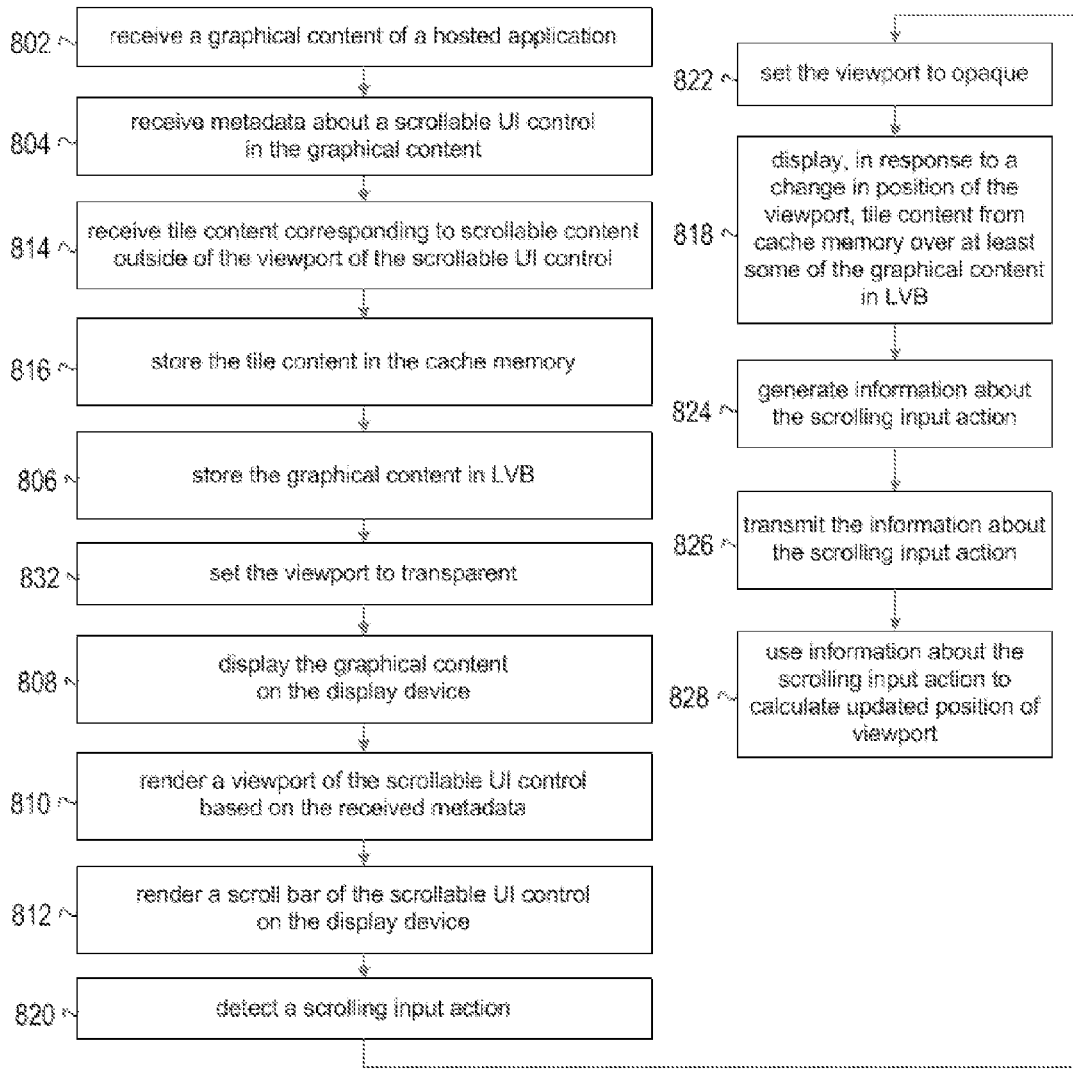

Now referring to FIG. 6, a flow diagram illustrating one embodiment of a method 600 for providing highly responsive scroller controls in a hosted desktop application. In brief overview, at step 605, a client agent 235 executing on a client mobile device 102 establishes a connection to a session hosted 220 by a server 106. At step 610, the client agent 235 receives (e.g., see step 804) metadata from the proxy session 220 hosted by the server 106 for scrollable controls of a hosted application 215. At step 615, the client agent 235 generates local transparent scrollable UI controls from the received metadata. At step 620, the client agent 235 displays the transparent viewport over the data displayed by the local video buffer. For example, a client-side scrollable UI control module may set, by default, the viewport to transparent (e.g., see step 832) such that the graphical content in the LVB underneath the viewport is displayed on the display device. In some examples, the status change of the viewport from opaque to transparent may be immediate once the position of the viewport with respect to the scrollable content is stationary. At step 625, the client agent 235 detects (e.g., see step 820) scroll operation data (e.g., a touch release action subsequent to a touch and move action) initiated by a user that may cause an adjusting of the position of the viewport on the client-side display with respect to scrollable content. The detecting and subsequent processing may be performed by a client-side scrollable UI control module. In addition, the client-side scrollable UI control module may generate (in step 824) information about the scrolling input action and transmit (in step 826) that information to a remote server 106. In one example, the information about the scrolling may include direction and velocity of scrolling and may be used by the client-side scrollable UI control module to calculate dimensions of tile content to pre-fetch from the server 106 for the cache memory 140. At step 630, the client agent 235 switches (e.g., sets in step 822) the generated snapshot overlay of the local scroller module to opaque. At step 635, the client agent applies the scroll operation data to the generated snapshot displayed in the viewport of the local scroller module. At step 640, the client agent 235 transmits the applied scroller operation data to the server 106. At step 645, the client agent 235 receives (e.g., see step 802) from the server 106 updated data for the local video buffer. The updated graphical content may be stored (in step 806) in the LVB and displayed (in step 808) on the display device 124 of the remote computing device 102.

Still referring to FIG. 6, and in more detail, at step 605, a client agent 235 executing on a client mobile device 102 establishes a connection to a session hosted 220 by a server 106. In some embodiments, the established connection is a presentation layer protocol. In some embodiments, the established connection is a virtual channel protocol for remoting the display of the hosted application 215. In some embodiments, the client agent 235 connects to an existing proxy session 220 hosted by the server 106. In some embodiments, the server 106 establishes a new proxy session 220 responsive to the connection request from the client agent 235 of the mobile client device 102.

At step 610, the client agent 235 receives metadata from the proxy session 220 hosted by the server 106 for scrollable controls of a hosted application 215. In some embodiments, the meta data received from the proxy session 220 hosted by the server 106 includes any combination of a rectangular bound of the hosted application 215 executed by the server 106, an extent of a scrollable content of the hosted application 215 executed by the server 106, a position of the viewport of the hosted application 215 executed by the server 106, and a z-order of a second generated snapshot. In some embodiments, the proxy session 220 transmits additional data to the client agent 235. In some embodiments, the client agent 235 receives the additional data and caches the data for later use. In some embodiments, the additional data may include low fidelity tile images.

At step 615, the client agent 235 generates a local transparent scrollable user interface (UI) control using the received metadata. In some embodiments, the client agent 235 creates a local scroller module. In some embodiments, the client agent 235 uses an existing local scroller module. When no scrolling input actions are pending, a viewport of the local scrollable UI control is set to transparent such that the underlying local video buffer (LVB) is visible. The snapshot overlay may be generated (and the viewport set to opaque) when a scrolling action is initiated or pending. At that time, the client agent 235 may generate the snapshot overlay using the data stored in the local video buffer, received from the server 106 and stored in cache memory 140, and the received metadata; and supplies it to the client agent 235. For example, in step 627, the client-side scrollable UI control module may populate the scrollable UI control's viewport (e.g., generate a snapshot overlay) using data stored in the LVB and/or pre-fetched cached tile content. As a result, in one example, the viewport is filled with the image from the LVB. In some embodiments, the local scroller module displays a low fidelity tile images cached by the client agent 235, and the client agent 235 may receive larger lossless images while the low fidelity tile images are displayed by the local scroller module to the user. The client agent 235 transmits the larger lossless images to the local scroller module which displays the images responsive to decoding of the larger lossless images.

At step 620, the client agent 235 displays the viewport of the local scroller module in a transparent state over the data displayed by the local video buffer. In some embodiments, the local scroller modules obscures the scroll bar of the local video buffer.

At step 625, the client agent 235 detects scroll operation data initiated by a user. In some embodiments, the mobile device 102 captures the scroll operation data initiated by the user and the client agent 235 receives the data. In some embodiments, the client agent 235 captures the scroll operation data initiated by the user. In some embodiments, the client agent detects that the gesture input received from the user does not initiate a scroll operation. The client agent 235 transmits the received data to the hosted application 215. In some embodiments, the hosted application 215 may ignore the received data. In other embodiments, the hosted application 215 uses the received data and processes the gestures as mouse down, mouse up or equivalent raw touch or gesture events. In some embodiments, the client agent 235 detects that the gesture input received from the user initiates a scroll operation and applies the scroll operation data to the local scroller module.

At step 627, the client-side scrollable UI control module may populate the scrollable UI control's viewport (e.g., generate a snapshot overlay) using data stored in the LVB. As a result, the viewport is filled with the image from the LVB, and the viewport (i.e., snapshot overlay) is ready to seamlessly replace the previously displayed image.

At step 630, the client agent 235 switches the generated snapshot overlay of the local scroller module to opaque. In some embodiments, the client agent 235 switches the generated snapshot overlay of the local scroller module to opaque responsive to detecting that the gesture input received from a user initiates a scroll operation. In response to a change in position of the viewport in the scrollable content, the client-side scrollable UI control module may display (in step 818) tile content from the cache memory in the viewport. In some embodiments, the client agent sends a request to the proxy session 220 for additional tiles responsive to the initiation of a scroll operation by the user. The client agent 235 (e.g., client-side scrollable UI control module) may receive the requested tiles and cache the data received from the server 106 during the application of scroll operation data to the generated snapshot by the local scroller module. For example, the remote computing device 102 may receive (in step 814) tile content corresponding to scrollable content outside of the viewport of the scrollable UI control. The received tile content may be stored (in step 816) in the cache memory 140 on the remote computing device 102.

At step 635, the client agent applies the scroll operation data to the opaque viewport of the local scroller module. In some embodiments, the client agent transmits the gesture data to the proxy session 220 and the proxy session calculates a final landing position of the viewport of the local scroller module responsive to receiving a flick applying inertia. In some embodiments, the client agent 235 calculates a final landing position of the viewport of the local scroller module responsive to receiving a flick applying inertia.

At step 640, the client agent 235 transmits the applied scroller operation data to the server 106. In some embodiments, the client agent reverts the local scroller module to transparent responsive to receiving updated data (e.g., graphical content) from the server and applying the updates to the local video buffer. In some embodiments, the client agent 235 applies the scroller operation data to the local video buffer prior to or simultaneously transmitting the scroller operation data to the proxy session 220, thus updating the local video buffer to reflect the changes applied to the local scroller module. Once the local video buffer reflects the ultimate disposition of the scrollable content of the local scroller module, the client agent 235 reverts the local scroller module to the transparent mode. In some examples, the graphical content from the server 106 may be more up-to-date than the local pre-fetched cached tile content, thus the updated graphical content from the server 106 may replace the content on the local device 102. Because the local video buffer and the local scroller module are now updated and typically identical, this action appears seamless to the user. In some embodiments, the client agent 235 receives scroll control data that does not initiate a scrolling action without modifying the generated snapshot of the local scroller module. The scroll control data is transmitted to the hosted application 215, which determines how to proceed with the received information.

At step 645, the client agent 235 receives from the server 106 updated data for the local video buffer. In some embodiments, the server 106 transmits updated data for the local video buffer. In some embodiments, the server 106 transmits an acknowledgement of the receipt of the updated data from the client agent 235.

While certain illustrative embodiments have been described and shown in the accompanying drawings, it is to be understood that such embodiments are merely illustrative of and not restrictive on the methods and systems described herein. In addition, one or more of the steps in the flowcharts may be optional and/or performed in an order different than that depicted in the flowcharts. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

We claim:

1. An apparatus, comprising:
at least one processor configured to execute computer-executable instructions, a hosted application, and a hosted mobile application runtime component associated with the hosted application; and
at least one memory storing the computer-executable instructions, which when executed by the processor, cause the apparatus to:
create, in the at least one memory, a session of the hosted application corresponding to a remote computing device;
determine, by the hosted mobile application runtime component, that a graphical content of the hosted application includes a scrollable UI control;
transmit, to the remote computing device, metadata about the scrollable UI control;
adjust a size of two-dimensional tile content based on at least one of measured network latency, network bandwidth, network queue lengths, and network bandwidth costs, wherein the two-dimensional tile content comprises a plurality of non-uniformly sized rectangular tiles of a non-uniform layout, and adjusting the size of the two-dimensional tile content further comprises adjusting a size of each of the plurality of non-uniformly sized rectangular tiles of the non-uniform layout;
transmit, to cache memory at the remote computing device, the two-dimensional tile content associated with the scrollable UI control, wherein the two-dimensional tile content corresponds to scrollable content outside of a viewport of the scrollable UI control;
receive, from the remote computing device, information about scrolling input actions; and
identify the two-dimensional tile content to prefetch using a rate of deceleration and the information about scrolling input actions, which comprises at least direction of scrolling and velocity of scrolling.

2. The apparatus of claim 1, wherein the graphical content of the hosted application includes a snapshot of a display of the hosted application.

3. The apparatus of claim 1, wherein the scrolling input actions comprise actions inputted on a touch screen input surface of the remote computing device, and wherein the memory further stores computer-executable instructions, which when executed by the processor, cause the apparatus to:
adjust a position of the viewport with respect to the scrollable content in response to at least one of: the received information about the scrolling input action.

4. The apparatus of claim 1, wherein adjusting the size of the two-dimensional tile content comprises changing a length and a width of the two-dimensional tile content.

5. The apparatus of claim 1, wherein the memory further stores computer-executable instructions, which when executed by the processor, cause the apparatus to:
adjust at least one size of the two-dimensional tile content further based on at least one of: download size of encoded data, memory constraints, image encoding method, and proximity to an edge of the scrollable content.

6. The apparatus of claim 1, wherein the metadata about the scrollable UI control comprises at least one of: position and size; extent of scrollable content; viewport position onto this extent; whether the control is visible; relative z-order to other scrollable UI controls in the session of the hosted application; background color; and scrollbar visibility.

7. The apparatus of claim 1, wherein the hosted mobile application runtime component comprises computer-executable instructions configured to discover, enumerate, and control a scrollable UI control contained in the hosted application.

8. The apparatus of claim 1, wherein the graphical content includes data associated with command remoting of a display of the hosted application.

9. A computer-assisted method, comprising:
creating, in computer memory by a computer processor, a session of a hosted application, wherein the session is associated with a hosted mobile application runtime component and communicatively coupled to a remote client computing device with a touch screen input surface configured to receive scrolling input actions;
determining, by the processor via the hosted mobile application runtime component, that a graphical content of the hosted application includes a scrollable UI control;
receiving, by the processor, metadata about the scrollable UI control, wherein the metadata comprises at least one of: position and size; extent of scrollable content; viewport position onto this extent; whether the control is visible; relative z-order to other scroller controls in the same application and session; background color; and scrollbar visibility;
identifying, by the processor, based on a velocity of scrolling and a measured latency of a network, scrollable content outside of a viewport of the scrollable UI control;
pre-fetching, by the processor, the identified scrollable content as two-dimensional tile content configured for storage in a memory at the remote client computing device, wherein the two-dimensional tile content to pre-fetch is identified using a rate of deceleration and information about scrolling input actions, which comprises at least a direction of scrolling and a velocity of scrolling;
adjusting at least one visual size dimension of the two-dimensional tile content based on at least one of measured network latency, network bandwidth, and network queue lengths, wherein the two-dimensional tile content comprises a plurality of non-uniformly sized rectangular tiles of a non-uniform layout, and the adjusting the at least one visual size dimension of the two-dimensional tile content further comprises adjusting a size of each of the plurality of non-uniformly sized rectangular tiles of the non-uniform layout;
transmitting, by the processor to the remote client computing device, the graphical content of the hosted application;
transmitting, by the processor to the remote client computing device, the metadata about the scrollable UI control; and
transmitting, by the processor to the remote client computing device, the pre-fetched two-dimensional tile content.

10. The method of claim 9, comprising:

creating, in the computer memory by the processor, a remote presentation layer protocol stack corresponding to the remote client computing device storing a client-side scrollable UI control module; and receiving, from the client-side scrollable UI control module, information about scrolling input actions.

11. The method of claim 10, comprising:

adjusting position of the viewport with respect to the scrollable content in response to the received information about scrolling input actions from the client-side scrollable UI control module.

12. A computer-assisted method, comprising:

receiving, from a remote server device, a graphical content of a hosted application executing on the remote server device;

receiving, from the remote server device by a client-side scrollable UI control module, metadata about a scrollable user interface (UI) control in the graphical content;

storing, in a local video buffer by a processor, the graphical content;

displaying, on a display device by the processor, the graphical content;

rendering, on the display device above the displayed graphical content by the client-side scrollable UI control module, a transparent viewport of the scrollable UI control based on the received metadata;

receiving, from the remote server device, a plurality of non-uniformly sized rectangular tiles of a non-uniform layout of a tile content corresponding to scrollable content outside of the viewport of the scrollable UI control, wherein visual size dimensions of the received plurality of non-uniformly sized rectangular tiles of the non-uniform layout of the tile content are based on at least one of: measured network latency, network bandwidth, network queue lengths, and network bandwidth costs;

storing, in cache memory by the client-side scrollable UI control module, the plurality of non-uniformly sized rectangular tiles of the non-uniform layout of the tile content;

detecting, by the client-side scrollable UI control module, a scrolling input action from a touch screen input surface;

in response to detecting the scrolling input action, setting the viewport to opaque such that the plurality of non-uniformly sized rectangular tiles of the non-uniform layout of the tile content from the cache memory are displayed over the graphical content in the local video buffer underneath the viewport;

displaying, in the viewport on the display device, the plurality of non-uniformly size rectangular tiles of the non-uniform layout of the tile content from the cache memory over the graphical content in the local video buffer underneath the viewport;

adjusting a position of the viewport with respect to the scrollable content based on the detected scrolling input action;

generating information about the scrolling input action, wherein the information about the scrolling input action comprises at least direction of scrolling and velocity of scrolling; and transmitting the information about the scrolling input action to the remote server device.

13. The method of claim 12, comprising:

receiving, from the remote server device, an updated graphical content of a hosted application executing on the remote server device, after the transmitting of the generated information about the scrolling input action;

storing, in the local video buffer by the processor, the updated graphical content;

setting, by the client-side scrollable UI control module, the viewport to transparent such that the updated graphical content is capable of being displayed on the display device underneath the viewport after the position of the viewport with respect to the scrollable content is stationary; and displaying, on the display device, the updated graphical content stored in the local video buffer.

14. The method of claim 12, wherein the scrolling input action is a touch release action subsequent to a touch and move action.

15. The method of claim 12, wherein the received metadata about the scrollable UI control comprises at least one of: position and size; extent of scrollable content; viewport position onto this extent; whether the control is visible; relative z-order to other scrollable UI controls in a session of the hosted application; background color; and scrollbar visibility.

16. The method of claim 12, wherein the visual size dimensions of the received tile content are length and width of the received tile content.

* * * * *